Patented Aug. 21, 1928.

1,681,169

UNITED STATES PATENT OFFICE.

WILLIAM F. BRANDT, OF FORT WAYNE, INDIANA, ASSIGNOR TO WAYNE COMPANY, OF FORT WAYNE, INDIANA, A CORPORATION OF INDIANA.

FOOT VALVE.

Application filed March 24, 1924. Serial No. 701,615.

My invention relates to poppet valves, particularly those adapted for use as foot valves for pumps. Such valves are especially useful on gasoline measuring and dispensing apparatus.

The object of my invention is to provide a strong, efficient poppet valve of few parts and simple construction that will make a leak-tight fit with its valve seat.

My improved valve is particularly adapted for use in gasoline or kerosene storage tanks where liquid is intermittently withdrawn from the tank and it is necessary that the pipe line from the storage tank to the pump be always full of liquid so as to ensure full measure at each pumping operation.

It is well known to those handling gasoline that it is difficult to construct a foot valve that will close so tightly as to prevent the leaking back of a portion of the liquid. When the pump is allowed to stand for a considerable period between times of use in dispensing gasoline, this leaking back causes a short measure, frequently resulting in dissatisfaction with the pumping mechanism, when the fault is entirely with the foot valve. The importance of a leak-tight foot valve is therefore apparent.

To obtain these advantages the pipe line is extended into and towards the bottom of the storage tank in the usual manner and is there fitted to my improved foot valve, which being leak-tight prevents the return of liquid into the storage tank after it has once passed the valve.

My invention is illustrated in the accompanying drawings, in which:—

Figure 1:
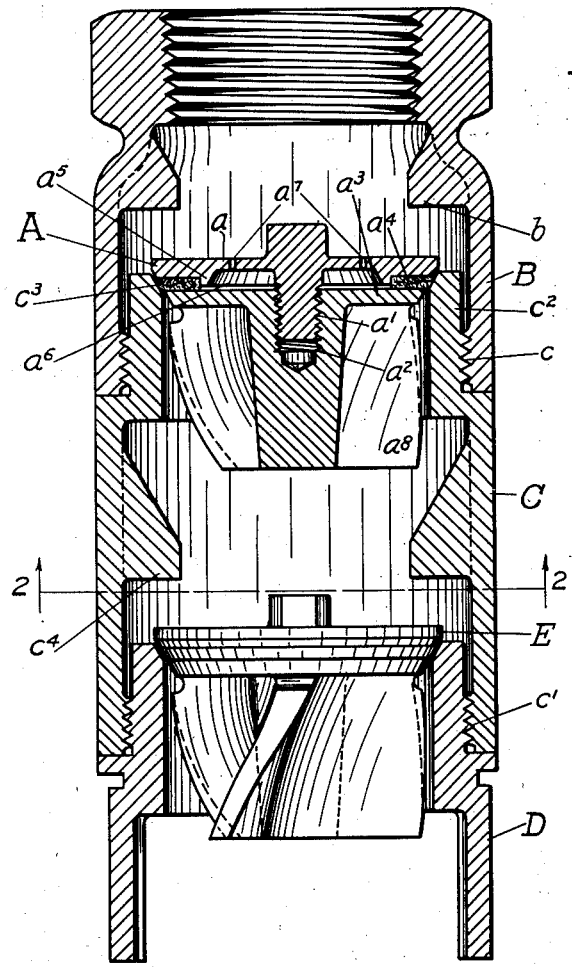
Figure 2:
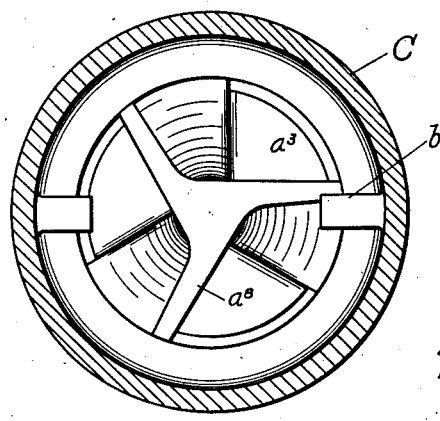

Figure 1 is a vertical axial section through a valve casing, seat and poppet constructed according to my invention. A second poppet is shown lower down in perspective; and Fig. 2 is a horizontal cross section on line 2—2 of Fig. 1 as though shown there in full.

Referring now to the drawings, particularly Fig. 1, which shows a valve casing made up of three sections B, C and D; section C is externally threaded at $c$ to engage section B and is internally threaded at $c^1$ to engage section D. An extension $c^2$ of section C is provided with an annular cutaway portion which forms an inclined valve seat $c^3$ for the poppet A.

The poppet A comprises a top plate $a$, provided with a screw threaded depending portion $a^1$, which engages corresponding screw threads in a socket $a^2$ formed in the bottom plate $a^3$. An annular gasket $a^4$, preferably of fiber or other suitable material of a kind that will swell when saturated, is rigidly held between the top and bottom plates $a$ and $a^3$ and is closely packed against a depending flange $a^5$ formed on the under side of the top plate $a$. The rims of the top plate $a$, gasket $a^4$ and bottom plate $a^3$ are all machined at an angle that will be parallel to the valve seat $c^3$ when the poppet is in place, and the gasket is of such size as to protrude beyond the contiguous conical face of the top and bottom plates. The gasket is kept saturated with the liquid being pumped, from the inside of the poppet by being in communication with chamber $a^6$ formed on the under side of the top plate $a$, which chamber $a^6$ is kept filled with liquid fed through the ports $a^7$ in the top plate $a$.

Stops $b$ are formed on the inner side of and integral with casing section B so as to limit the upward movement of poppet A.

Helical vanes $a^8$ are formed on the under side of the bottom plate so as to cause the poppet A to shift at each time of rising to ensure a new contact on each reseating.

A second poppet E shown in the drawing in perspective is constructed in the same manner as before described for poppet A, and is limited in its upward movement by stops $c^4$ formed on the inner side of and integral with the casing section C.

I claim as my invention and desire to secure by Letters Patent of the United States:—

1. In a foot valve of the poppet type, a conical poppet having in combination a top plate, and a bottom plate, with substantially parallel contiguous faces near their peripheries, a common conical face formed by said top and bottom plates, means for rigidly securing said top plate to said bottom plate, a substantially flat gasket secured between said top and bottom plates at their peripheral edges, said gasket extending beyond the line of the common conical face formed by the said top and bottom plates, a chamber adapted to contain liquid between said top and bottom plates and opening on to the inner edge of said gasket and ports through said top plate to allow the entry of liquid into said chamber.

2. In a valve having a conical seat, a poppet valve having in combination an upper member, a lower member, a common conical face formed by said upper and lower members when assembled for use, a flat ring gasket of material adapted to swell when saturated, said gasket compressed between said upper and lower members at their peripheral edges, said ring periphery extending slightly beyond the contiguous metal portions of said valve, a chamber adapted to contain liquid between said upper and lower members and opening onto the inner edge of said gasket, a port through one of said members to allow the entry of liquid into said chamber, and means for rigidly securing together said upper and lower members with the gasket compressed between them.

3. In a valve having a conical seat, a poppet valve having in combination; an upper member, a lower member, a common conical face formed by said upper and lower members when assembled for use, an annular gasket made of material adapted to swell when wet, said gasket compressed between the peripheral edges of said upper and lower members, means for admitting the liquid above said valve through the upper plate to said gasket, said gasket extending outwardly slightly beyond the contiguous portions of said valve, and means for securing together said upper and lower members with the gasket compressed between them.

In testimony whereof I have hereunto set my hand.

WILLIAM F. BRANDT.